April 30, 1929.  A. B. DRÄGER  1,710,813
PROTECTIVE MASK FOR USE IN NOXIOUS GASES
Filed April 16, 1927
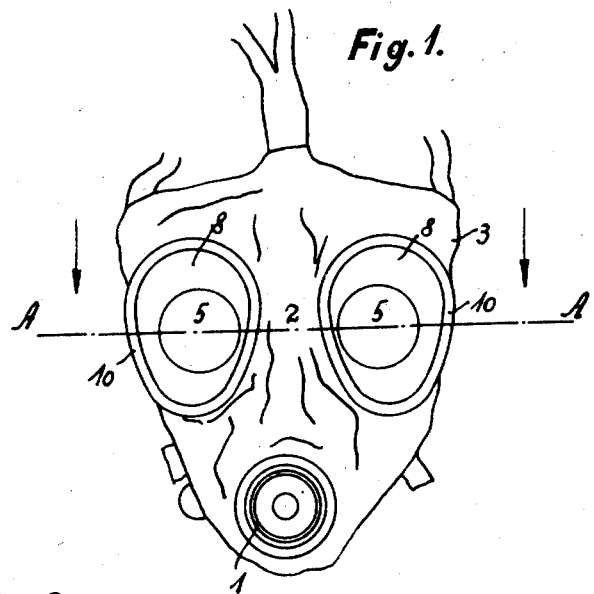
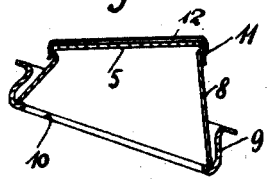
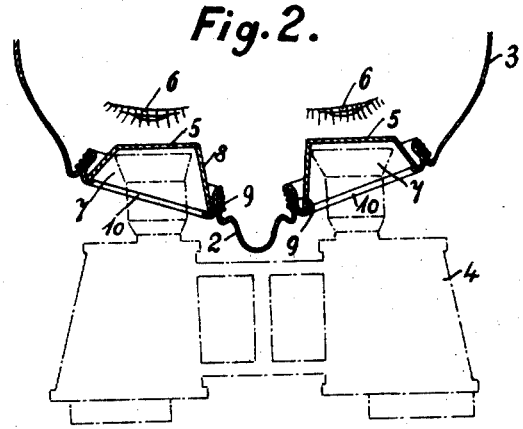
INVENTOR
ALEXANDER BERNHARD DRÄGER
BY
ATTORNEYS Patented Apr. 30, 1929.

1,710,813

UNITED STATES PATENT OFFICE.

ALEXANDER BERNHARD DRÄGER, OF LUBECK, GERMANY, ELFRIEDE DRÄGER, NÉE STANGE, EXECUTRIX OF SAID DRÄGER, DECEASED.

PROTECTIVE MASK FOR USE IN NOXIOUS GASES.

Application filed April 16, 1927, Serial No. 184,212, and in Germany April 28, 1926.

The present invention relates to improvements in protective masks for use with noxious gases, and is based on the discovery of a material defect inherent to the protective masks hitherto in use. This defect or drawback consists in that the wearer of a usual protective mask is not in a position to make use of a telescope or a field-glass. The present invention discloses suitable means to remedy the said drawback.

In protective masks of usual construction, as is known, the sight-glasses or windows are an appreciable distance from the eyes of the wearer of the mask. Only very few faces allow or admit of an approaching or pressing of the sight-glasses so close to the eyes that when using a field-glass for example, the eye-pieces of the latter are near enough to the eyes to render possible a tolerably good vision.

According to the present invention the possibility of good vision is thereby attained by transferring the sight-glasses of the protective mask from out of the surface of the wall of the mask into the interior of the mask-body until close in front of the eyes of the wearer. For this purpose the sight-glasses are expediently placed each in a funnel-shaped cavity of the wall of the mask and that in a common plane, so that when using a field-glass for example, the openings of the eye-pieces which are likewise in a common plane, may fit or bear flatly against the sight-glasses. Each separate window is expediently formed in such a manner that the sight-glass and its case made in one single piece or separately, has the shape of a hollow truncated cone or pyramid open at its outer end, the two bases of which are not parallel and may have different configurations or outlines. Preferably the base forming the opening in the wall of the mask-body may have an oblong or oval outline, and the base which is formed by the sight-glass proper a circular outline.

In the accompanying sheet of drawings which illustrate a preferred embodiment of the invention, Fig. 1 is a front view or elevation of the improved protective mask, Fig. 2 is a horizontal sectional view on the line A—A of Fig. 1 and Fig. 3 shows on a larger scale a horizontal cross-section of one of the windows.

Similar letters of reference characters refer to similar parts throughout the several views.

In order to make available a protective mask 3 provided with a connecting piece 1 for a breathing device and a rounded-out or projecting hollow part 2 for the reception of the nose of the wearer, for the use in connection with a field-glass or even a simple telescope, the windows or sight-glasses proper 5 having, as illustrated in the drawing, a circular outline, are located in the interior of the mask instead of in the surface of the wall of the mask-body as usual. They are therefore located in close proximity to the eyes 6 of the wearer (Fig. 2) in such a manner that the two sight-glasses 5 lie in a common plane and the eye-pieces or oculars 7 of the field-glass fitting flatly the said sight-glasses, may be introduced into the truncated hollow cones 8 in the nearest possible position to or vicinity of the sight-glasses. The rims of larger diameter of the cones or funnels are tightly attached to the rims of openings 10 in the mask 8 preferably by means of fastening-rims 9 so as to be sealed therein in a gas tight manner. In this construction either the sight-glasses 5 only or also the cones 8 may be made of transparent material such as cellon, celluloid and the like. The parts 5 and 8 may be manufactured in one single piece or composed of separate pieces. Finally all three parts 5, 8 and 9 may consist of one single piece of cellon, celluloid or any other suitable transparent material. The eye-piece constituted by the members 5, 8 and 9 consists, practically, of a funnel-shaped frame hollow truncated cone or pyramid 8 open only at its outer end, the two bases of this body being however not parallel. In the example shown the two non-parallel bases of the truncated cone or pyramid possess expediently different outlines, that is to say, the base forming the opening 10 and being situated in the surface of the wall of the mask has an oval configuration and the base formed by the sight-glass 5 a circular one. The sight-glass 5 (Fig. 3) is provided at its rim with an annular enlargement 11 or similar means which allows of the attachment of an antidimming film 12 on the inner side of the sight-glass 5.

The shell-shaped oculars of the field-glasses are for the most part detachable. By removing these eye-pieces and replacing them by extremely short ones it will be possible to bring the field-glass still nearer to the eyes of the wearer of the mask. The eye-pieces may also receive a special form, for example such that they are somewhat leveled at the side adjacent to the nose of the wearer in order to comfortably adjust the eye-pieces and the optical axes of the field-glass when the latter is inserted into the funnel-shaped windows, according to the axial distance of the eyes of the wearer without being obstructed by or interfered with the projecting nasal part 2 of the mask.

I claim:

1. In a protective gas mask having openings adapted for registry with the eyes of the wearer, the combination of two eye-pieces each comprising a funnel-shaped frame having a rim of smaller diameter and a rim of larger diameter, the latter being located in a plane forming an angle with the plane of the rim of smaller diameter, the rim of larger diameter being attached and sealed to the rim of one of said openings so that said frame projects into the interior of the mask, and a window tightly enclosed by said rim of smaller diameter, both eye-pieces being so shaped, dimensioned and correlated that their respective windows are located in the same plane in close proximity to the eyes of the wearer when the mask is in proper position, and that the oculars of a field-glass of conventional size may be introduced into their respective frames.

2. The combination set forth in claim 1, in which in either eye-piece the rim of larger diameter has a different configuration from the rim of smaller diameter.

3. The combination set forth in claim 1 in which in either eye-piece the rim of larger diameter is oval while the rim of smaller diameter is circular.

4. In a protective gas mask having a front body portion designed to fit loosely over the face and provided with openings adapted for registry with the eyes of the wearer, an eye-piece comprising a funnel-shaped frame having its rim of larger diameter attached and sealed to the rim of one of said openings, said frame projecting into the interior of the mask so that its rim of smaller diameter is within said mask, and a window tightly enclosed by the latter rim of said frame at substantially the edge of such rim, said frame being so shaped and dimensioned that said window is in close proximity to the eyes of the wearer when the mask is in proper position and that the oculars of a field-glass of conventional size may be introduced into said frame.

5. In a protective gas mask having a front body portion designed to fit loosely over the face and provided with openings adapted for registry with the eyes of the wearer, the combination of two eye-pieces each comprising a funnel-shaped frame having its rim of larger diameter attached and sealed to the rim of one of said openings, said frame projecting into the interior of the mask so that its rim of smaller diameter is within said mask, and a window tightly enclosed by the latter rim of said frame at substantially the edge of such rim, both eye-pieces being so shaped, dimensioned and correlated, that their respective windows are located in the same plane in close proximity to the eyes of the wearer when the mask is in proper position, and that the oculars of a field-glass of conventional size may be introduced into their respective frames.

In testimony whereof I have signed my name to this specification.

ALEXANDER BERNHARD DRÄGER.